US005660613A

United States Patent [19]

Bernier et al.

[11] Patent Number: 5,660,613
[45] Date of Patent: Aug. 26, 1997

[54] ANAEROBIC/AEROBIC DECONTAMINATION OF DDT CONTAMINATED SOIL BY REPEATED ANAEROBIC/AEROBIC TREATMENTS

[75] Inventors: Roger L. Bernier, Montreal; Neil C. C. Gray; Ann L. Gray, both of Oakville, all of Canada

[73] Assignee: Zeneca Corp., Stoney Creek, Canada

[21] Appl. No.: 533,238

[22] Filed: Sep. 25, 1995

[51] Int. Cl.$^6$ .................. C05F 3/00; C05F 9/04; B04B 3/00; A62D 3/00
[52] U.S. Cl. .................. 71/15; 71/21; 71/23; 71/25; 71/903; 435/262; 435/262.5; 588/207
[58] Field of Search .................. 71/15, 21, 23, 71/25, 903; 435/262, 262.5; 588/207

[56] References Cited

U.S. PATENT DOCUMENTS

| | | | |
|---|---|---|---|
| 5,455,173 | 10/1995 | Crawford et al. | 435/264 |
| 5,503,774 | 4/1996 | Brons et al. | 252/357 |

OTHER PUBLICATIONS

"Anaerobic DDT Biodegradation: Enhancement by Application of Surfactants and Low Oxidation Reduction Potential", Applied and Enviromental Microbiology, Dec. 1994 You et al., pp. 1–35.

"Anaerobic DDT Degradation of Contaminated Soil by Mixed Consortia and Enhancement by Surfactant Addition in Slurry Reactors," You et al., Water Environment Federation, Oct. 1994, pp. 635–645.

"Priciples of Composting", Golueke; The Biocycle Guide to the Art or Science of Composting; Journal of Waste Recycling; The JG Press, Inc, 1991 no month, pp. 14–27.

"Microbiological Degradation of Pesticides in Yard Waste Composting", Fogartz et al, Microbiological Reviews, Jun. 1991, pp. 225–233.

"Disposing of Organic Hazardous Wastes by Composting", Savage et al., BioCycle Jan./Feb, 1985 pp. 31–34.

J. F. Parr and Smith "Degradation of DDT in an Everglades Muck as affected by Lime, Ferrous Iron & Anaerobiosis" *Soil Science*, 1974 pp. 545–552 (vol. 188 No. 1).

*Primary Examiner*—Ferris Lander

[57] ABSTRACT

The present invention provides a process of decontaminating soil and/or sediments containing DDT type contaminants by converting these contaminants into harmless materials thereby decontaminating the soil to whatever extent desired, either partial decontamination or complete remediation.

12 Claims, No Drawings

ANAEROBIC/AEROBIC DECONTAMINATION OF DDT CONTAMINATED SOIL BY REPEATED ANAEROBIC/AEROBIC TREATMENTS

BACKGROUND OF THE INVENTION

This invention relates to a controlled process for decontaminating soil or sediments containing DDT contaminants.

Numerous land sites exist that are contaminated with the insecticide DDT (1,1,1-trichloro-2,2-bis(p-chlorophenyl) ethane). Various methods have been used to decrease the contamination of the soil including incineration, low temperature thermal desorption and chemical treatments. All of these methods are extremely expensive and may not be suitable for many contaminated sites.

Prior art papers disclose laboratory experiments in biodegradation of DDT in soil slurries. They disclose admixing DDT contaminated soil with municipal treatment plant anaerobic sludge, a non-ionic surfactant and a reducing agent in an aqueous liquid system. Significant biodegradation of DDT occurred in these experiments, but toxic metabolites of DDT remained.

SUMMARY OF THE INVENTION

The present invention provides a process of decontaminating soil and/or sediments containing DDT type contaminants by converting these contaminants into harmless materials thereby decontaminating the soil to whatever extent desired, either partial decontamination or complete remediation. The process comprises treating soil and/or sediment which contains a population of viable anaerobic and aerobic microbes capable of transforming DDT type contaminants into harmless materials and being viable under both anaerobic and aerobic conditions. The treatment comprises forming a degradation zone comprising said soil and/or sediment; maintaining the degradation zone at a temperature in the range of about 15° C. to 37° C., and maintaining a microbial population of at least $10^5$ cfu/g in the degradation zone during the anaerobic and aerobic steps of the process; supersaturating the degradation zone with water and rendering it anaerobic; maintaining the degradation zone supersaturated with water and at a redox potential level below about negative 200 mV until a significant amount of DDT type contaminants is degraded; thereafter oxygenating the degradation zone to render it aerobic; maintaining the degradation zone at a redox potential level above about positive 100 mV until a significant amount of DDT type contaminants is degraded; and repeating the anaerobic and aerobic degradation steps until the desired decontamination is achieved.

DESCRIPTION OF THE INVENTION

"DDT type contaminants" means 1,1,1-trichloro-2,2-bis (p-chlorophenyl)ethane(DDT); 1,1,dichloro-2,2-bis(p-chlorophenyl)ethane(DDD); 2,2-bis(p-chlorophenyl)1,1-dichloroethylene, (DDE); and metabolic transformation products of DDT, DDD and DDE including 1-chloro-2,2-bis(p-chlorophenyl)ethylene(DDMU), 2,2-bis(p-chlorophenyl)ethylene(DDOH), dichlorodiphenylmethane (DPM), dichlorobenzophenone (DBP), dichlorobenzydrol (DBZ), and unsym-bis(p-chlorophenyl)ethylene dichlorophenylacetate (DDA). Some DDT type contaminants are present in the soil before decontamination by the present process; some may be formed as transformation products during the present process.

"Harmless materials" mean materials that are unobjectionable in the concentrations present in soil or sediment for its intended use.

"Decontamination" means transforming DDT type contaminants to harmless materials, including biodegrading said contaminants and binding said contaminants to soil or other material.

"Remediation" means decontamination to an unobjectionable level of DDT type contaminants in the soil for the intended use of the soil.

"Soil" means earth, i.e. humus, sand and particulate rock, and includes sediment from beneath the surface of water.

"Supersaturated with water" in referring to the decontamination zone means that the soil in the decontamination zone has a water content greater than 100% of its water holding capacity (WHC); i.e. the soil is immersed in water with standing water above the top of the soil, and/or excess water greater than 100% WHC is being removed from the soil, such as leachate being drained from the bottom of the degradation zone.

In the process of the present invention, during degradation the soil to be decontaminated must contain appropriate types of indigenous viable microbes capable of degrading DDT type contaminants. These microbes must be viable under both the anaerobic and aerobic conditions to which they will be subjected during the present process. The microbes normally are bacteria, fungi, actinomycetes and to a lesser extent protozoa. The microbes preferably are indigenous to the contaminated soil, that is, they are present in the soil to be decontaminated; or they are recycled from, or along with, soil already subjected to the present process. In some cases it may be beneficial to add an inoculant containing such viable DDT-degrading microbes.

In the practice of the present invention, a degradation zone comprising the soil is formed. The degradation zone is a space containing the soil to be decontaminated. The soil may be in-place surface and subsurface soil, i.e. in situ contaminated soil, or preferably it is piled in a decontamination zone. Preferably the decontamination zone is circumscribed by a wall or burm to retain the water in which the soil is supersaturated. The decontamination zone may contain a piping system to aerate and oxygenate the soil during aerobic treatment and/or to supply oxygen-free gas during anaerobic treatment. Normally it is sheltered to exclude rainfall.

During the anaerobic and aerobic steps of the present process, the temperature of the degradation zone is maintained in the range of about 15° C. to 37° C. This normally is the temperature range that occurs when biodegradation is taking place at a sufficient rate to achieve decontamination in a reasonable time. To achieve degradation in a reasonable time, during the anaerobic and aerobic steps microbial population counts of at least $10^5$, and preferably at least $10^7$, aerobic and anaerobic culture forming units per gram (as measured by standard plate count techniques (cfu/g)) are maintained in the degradation zone. These microbe counts of course include microbes other than those that degrade DDT type contaminants. The addition of nutrients and/or a source of the appropriate microbes may be desirable. During the process the aerobic microbes in the soil mixture remain viable for the subsequent aerobic degradation step and the anaerobic microbes remain viable for any needed subsequent anaerobic degradation steps. Thus, it is essential in the process of the present invention that viable aerobic and anaerobic degradation microbes be maintained.

During the present process, usually it is preferred to add surfactants to the degradation zone. Anionic and nonionic surfactants are preferred. Normally a mixture of nonionic and ionic surfactants is employed. The surfactants should be biodegradable, non-inhibitory to the microbial population, and have the ability to enhance biodegradation of DDT and DDT metabolites. Suitable surfactants include polysorbates, octoxynols, anionic alkyl sulfates, anionic alkyl aryl sulfonates, and ethoxylates. Examples of suitable surfactants include "Tween" nonionic surfactants which are commercially available from ICI Americas, Inc., "Triton" nonionic surfactants which are commercially available from Union Carbide, and "DAWN" detergent nonionic surfactant mixture which is commercially available from Procter & Gamble. A suitable mixture of surfactants is "Triton" X-100 and "DAWN".

In the present process, the degradation zone is rendered anaerobic by supersaturating it with water to substantially eliminate oxygen. Sufficient water is put into the decontamination zone in excess of 100% WHC to create an oxygen barrier. Oxygen in the water is depleted by the microbes.

During the anaerobic step a low redox potential is maintained in the degradation zone, below about negative 200 mV. This level has been found to be optimum for the anaerobic degradation of DDT type contaminants in the present process. Not intending to be bound by the following theory, at less negative redox potential levels, apparently too much oxygen is present for rapid DDT degradation. The redox potential level can be maintained within this range by the addition of conventional nutrient and/or reducing agents such as sulphite and/or acetate compounds.

The first anaerobic step and any subsequent anaerobic steps are continued until a significant amount of DDT type contaminants is degraded. This can be determined by analysis. Typically, in the first anaerobic step degradation of about 10% to 50% of the initial content of DDT type contaminants is desirable.

After the DDT-type contaminant content of the soil is decreased to the desired level during the first anaerobic degradation step, the degradation zone is oxygenated to render it aerobic. Aeration is continued sufficiently to maintain the degradation zone at a redox potential level above about positive 100 mV during the aerobic degradation step.

Oxygenating is done by any conventional technique. Preferably this is done by having the water level low enough for air to penetrate into the soil. Desirably the soil is cultivated and/or air is also passed through the decontamination zone to maintain the desired redox potential level.

The aerobic conditions activate degradation of the DDT type contaminants, particularly DDT metabolites, yielding harmless materials. The aerobic degradation step is continued until a sufficient amount of DDT-type contaminants is degraded.

In the present process, the desired degree of biodegradation of DDT type contaminants for acceptable remediation cannot be achieved in a reasonable time in the first sequence of anaerobic/aerobic treatment steps of negative/positive redox potential levels. The sequence must therefore be repeated, usually more than one time, as needed to achieve the desired soil decontamination. Substantially complete decontamination from DDT type contaminants is readily achievable by the present decontamination process of several sequences of anaerobic/aerobic degradation steps.

Not intending to be bound by the following theory, it is believed that during anaerobic degradation the anaerobic microbes remove at least one or two aliphatic chlorines from DDT type contaminants. The toxic metabolites, primarily DDD and to a lesser extent DDE, are the initial anaerobic step biodegradation products of DDT. Further aerobic degradation reduces these to less toxic metabolites, primarily DDMU and DDOH, DPM, DBP, DBH and DDA. Aerobic degradation then further transforms these metabolites to less chlorinated compounds. Since significant quantities of DDT type contaminants, particularly metabolites, may also be bound to soil and/or organic materials in the present process producing harmless materials, the term "degradation" as used herein includes not only biodegradation but also such binding of contaminants.

A desirable feature of this process is that the DDT-degrading microbes are maintained viable throughout the anaerobic/aerobic treatment cycles, so that it is not essential that microbes be supplemented before repeating the treatment cycle. However, it may be desirable to add amendment containing more nutrient materials or other conventional fermentation ingredients, primarily to supplement the organic feed supply. From 0 to about 5% (by weight of the soil) nutrient material addition is preferred, and is added in either the aerobic or anaerobic degradation step, to maintain sufficient nutrient material to support the metabolism of the high anaerobic and aerobic microbial populations.

As aforementioned, maintaining the proper redox potential levels of the soil in the anaerobic and aerobic steps is necessary for efficient practice of the present invention. Absolute anaerobic and aerobic conditions are needed (although short localized excursions can be expected). Thus, for the purpose of defining the present invention, a redox potential level of lower than about negative 200 mV is considered anaerobic and is required for the anaerobic steps; and a redox potential level greater than about positive 100 mV is considered aerobic and is required for the aerobic steps. The redox potential level from about negative 200 mV to about positive 100 mV is considered anoxic. Thus, "rendering" the soil or degradation zone anaerobic or aerobic means making the redox potential level of the soil or degradation zone lower than about negative 200 mV (anaerobic) or greater than about positive 100 mV (aerobic).

The soil to be treated can be analyzed and treated in the laboratory by the present process to determine optimizing treating conditions, additives, and anaerobic and aerobic step times and the number of sequences thereof.

In one preferred technique in practicing the present invention referred to as the immersion technique, the upper surface of the soil in the decontamination zone is more or less horizontal. This technique is particularly useful in in situ treatment where the contaminated soil is not excavated and transported to a decontamination cell. Desirably the soil will be cultivated to facilitate uniformity and speed of treatment. In this immersion technique, which can also be practical in an enclosed cell (or even in a laboratory test tube), the soil is supersaturated with water for the anaerobic treatment step by immersing the soil in water to form an oxygen barrier. Depending on the depth and area of the decontamination zone and its exposure to the elements, an immersion depth of from a few inches to a foot or more is employed. Microbial activity consumes the available oxygen rendering the decontamination zone strongly anaerobic, at a redox potential level of lower than negative 200 mV, where it is maintained until a significant amount of DDT type contaminants is degraded. Nutrient and/or microbe addition may be desirable to maintain the strong anaerobic conditions and the desired $10^5$ cfu/g anaerobic microbe population. Desirably a surfactant mixture of the above described type is also added.

In this immersion technique, water is then removed from the treatment zone to less than 100% WHC, but preferably maintained at greater than 50% WHC, and the decontamination zone is oxygenated. Oxygenation normally is achieved by cultivation and/or the passage of air through the soil in the decontamination zone by any suitable means.

Oxygenation renders the decontamination zone strongly aerobic, activating the aerobic microbes. A redox potential level of greater than about positive 100 mV is maintained. Nutrition and/or microbe addition may be desirable to maintain the strong aerobic conditions and the desired $10^5$ cfu/g aerobic microbe population. This aerobic degradation step is continued until a significant amount of DDT type contaminants is degraded. Usually a major percentage, often approaching substantially complete degradation, of available DDT metabolites is achieved in each aerobic step.

The decontamination zone is then again supersaturated in water by immersion, giving the soil another anaerobic treatment step. This in turn is followed by another aerobic treatment step. The anaerobic/aerobic treatment step sequence is repeated as many times as needed to achieve the desired level of decontamination. Remediation is readily achievable in most instances.

In another preferred technique, referred to as the biopile technique, the decontamination zone is not immersed in water. The soil is piled in the decontamination zone, usually in a treatment cell having water containing sides and bottom, with aeration and leachate collection and recirculating means. The decontamination zone soil is supersaturated with water during both the anaerobic and aerobic degradation steps.

Supersaturation is achieved by feeding water continually onto the top of the pile, such as by spraying or dripping water from one or more nozzles, in such a manner as to wet substantially all of the soil in the decontamination zone beyond 100% WHC. Excess water leaches out from the bottom of the pile, and preferably is recycled and again fed onto the top of the pile. Several such piles may be present in the decontamination zone.

During the anaerobic step normally no air or gas is added or drawn through the system. Microbial activity renders the decontamination zone anaerobic, and it is maintained anaerobic at a redox potential level of lower than about negative 200 mV by maintaining an anaerobic microbial population of at least $10^5$ cfu throughout the anaerobic steps. Nutrient, additional microbes and surfactant mixture may be added during the anaerobic degradation step.

After the desired significant amount of DDT type contaminants is degraded in an anaerobic degradation step, the biopile decontamination zone comprising the soil being treated is oxygenated by feeding gaseous oxygen, preferably as air, through the soil to render the soil aerobic and activate the aerobic microbes. Throughout the aerobic degradation steps water (preferably recycled leachate) is fed to the top of the biopile to maintain the degradation zone supersaturated; gaseous oxygen is supplied to the soil; and leachate is drained from the decontamination zone. Nutrient, supplemental microbes and surfactant may be added as needed to achieve sufficient microbial action to maintain the desired decontamination zone aerobic microbial population of at least $10^5$ cfu/g, the temperature and the rapid contaminant degradation. After the desired significant amount of DDT type contaminants is degraded in the initial aerobic step, the biopile decontamination zone is deoxygenated and again treated anaerobically, followed by oxygenation and aerobic decontamination treatment. The anaerobic/aerobic step sequence is repeated as needed to achieve the desired decontamination. Complete remediation is readily achievable in most instances.

Although the preferred biopile technique is not readily adaptable for in situ soil treatment, and therefore usually requires excavation and transportation of the decontaminated soil, the biopile technique can be better controlled and in general decontaminates the soil more rapidly. It is particularly useful for treating highly contaminated soil.

As above described, the present process involves a plurality of sequences of an anaerobic degradation stage followed by an aerobic degradation step. These sequences are necessary to adequately degrade DDT and DDT metabolites in a reasonable time. However, it may be desirable to initially treat the soil aerobically to lower the content of pre-existing DDT metabolites prior to the initial anaerobic stage.

The following Examples are illustrative of the practice of the present Invention:

EXAMPLE 1

This example compares the repeated anaerobic/aerobic sequence treatment method of the present invention with single anaerobic treatment and single aerobic treatment in the degradation of DDT in a soil system.

The soil in this example contains populations of >$10^5$ cfu/g viable aerobic and anaerobic microbes capable of rendering DDT-type contaminants harmless and being viable under both anaerobic and aerobic conditions. This soil contains DDT (200 ppm), DDD (22 ppm) and DDE (18 ppm).

Six 20 g samples of soil are each mixed with 25 ml of water containing 500 ppm each of cysteine and sulphite reducing agents and 500 ppm of "Triton"-X-100. To these slurries are added 1 ppm of radiolabelled 4,4'-DDT-ring UL $C^{14}$ in hexane. Two 20 g samples are incubated anaerobically (in 50-ml polypropylene tubes at 35° C., stationary); two 20 g samples are incubated aerobically (in rotating jars with foam plugs at 35° C., 150 rpm); and two 20 g samples are incubated on a 2 week anaerobic/2 week aerobic cycle for a total of 8 weeks.

Redox potential is monitored. After the aerobic phase redox is greater than +100 mV and after the anaerobic incubation redox potential is less than –200 mV.

The incubation samples are extracted, and the fate of the radiolabelled DDT is determined by thin layer chromatography and autoradiography/densitometry. The experiments are repeated to obtain average results. Average results are shown in Table 1.

TABLE 1

| Fate of Radiolabelled DDT in the Soil System (% remaining after tests) | | | | |
| --- | --- | --- | --- | --- |
| Treatment | % DDT | % DDD | % DDE | % Other |
| Aerobic | 80 | 17 | 2 | 1 |
| Anaerobic | 60 | 30 | 0 | 10 |
| Anaerobic then Aerobic | 10 | 60 | trace | 30 |

EXAMPLE 2

This example shows the present invention anaerobic/aerobic sequence method used to decrease DDT contamination in soil within 8 weeks, and the usefulness of different surfactants to aid the process.

The soil to be remediated contains populations of >$10^5$ cfu/g of viable aerobic and anaerobic microbes capable of rendering DDT-type contaminants harmless and being viable under both anaerobic and aerobic conditions. This soil contains DDT (200 ppm), DDD (22 ppm) and DDE (18 ppm). Six twenty gram samples of soil are added to 50-ml polypropylene tubes with 25 ml of water containing 500 ppm each of cysteine and sulphite reducing agents. This creates a supersaturated anaerobic degradation zone immersed in water. To each slurry sample is added 500 ppm of different surfactants and 1 ppm of radiolabelled 4,4'-DDT ring UL $C^{14}$ in hexane.

The tubes are capped and incubated stationary for 2 weeks at 35° C. After 2 weeks the tubes are opened and the contents are each transferred to a foam-capped jar and aerated by rotary incubation (150 rpm), for a further 2 weeks at 35° C. The anaerobic/aerobic cycle is repeated 2 times.

The samples are then extracted and the fate of the radio-labelled DDT is determined by thin layer chromatography and autoradiography/densitometry. The experiments are replicated to obtain average results. Average results are shown below.

TABLE 2

Fate of Radiolabelled DDT in the Soil System
(% remaining after tests)

| Treatment | % DDT | % DDD | % DDE | % Other |
|---|---|---|---|---|
| No Surfactant | 85 | 15 | 0 | 0 |
| "Triton" X-100 | 0 | 40 | trace | 60 |
| "Dawn" | 10 | 75 | trace | 15 |

EXAMPLE 3

This example shows the effect of the anaerobic/aerobic cycling method of the present invention on a DDT-contaminated soil in a pilot scale experiment. Three-quarters of a ton of soil that contains DDT (728 ppm), DDD (87 ppm) and DDE (50 ppm) is placed in an enclosed degradation zone box 8 foot by 8 foot by 18 inches. It is alternately immersed in water and drained on one month cycles. Sodium acetate nutrient (500 ppm) is added as required to maintain the COD above 300 mg/L, and a mixture of "Triton" X-100 and "DAWN" nonionic surfactants is added as required to maintain the surface tension in the leachate below 70 dynes/cm. The material is cultivated by hand weekly to aerate the degradation zone and render it aerobic during the drained phase. During the treatment, the temperature ranges from 22° C. to 28° C. The redox potential level in the treatment zone stays below negative 200 mV while immersed in water and above positive 100 mV while drained. While drained the water content of the soil is in the range of 40–100% WHC.

After 16 weeks 72% of the DDT, 31% of the DDD and 54% of the DDE is degraded, as measured by solvent extraction and GC ECD analysis.

EXAMPLE 4

This example shows the large scale anaerobic/aerobic repeated sequence method of the present invention, using the biopile technique. Eight tons of soil containing DDT (728 ppm), DDD (87 ppm) and DDE (50 ppm) is placed in an enclosed degradation zone box 8 foot by 8 foot by 8 feet. The soil is amended with 5% straw nutrient. Water is continuously dripped onto the surface of the soil to supersaturate, and the leachate is collected at the bottom and recycled at a rate of 20 to 100 L/tonne/day. Oxygenation is accomplished by passing air through a mechanical distribution system in the soil at the rate of 44 L/tonne/day, weekly alternating the air on and off. The temperatures of the soil during treatment range from 22° C. to 28° C. The redox potential level in the treatment zone stays below negative 200 mV when aeration is off and above positive 100 mV when aeration is on.

Sodium acetate nutrient is added as required to boost the COD to above 300 mg/L, and maintain population counts above $10^5$ cfu/g, of anaerobic and aerobic bacteria; and surfactants (a mixture of "Triton" X-100 and "DAWN") is added as required to maintain surface tension below 70 dynes/cm measured in the leachate, which is recycled.

After 16 weeks of cycling, 53% of the DDT is degraded, 55% of the DDD, and 54% of the DDE.

What is claimed:

1. The process of decontaminating soil containing DDT-type contaminants which soil contains a population of viable anaerobic and aerobic microbes capable of transforming DDT-type contaminants into harmless materials and being viable under both anaerobic and aerobic conditions comprising:
   a) forming a degradation zone comprising said soil;
   b) maintaining said degradation zone at a temperature in the range of about 15° C. to 37° C., and maintaining in said degradation zone microbial population counts of at least $10^5$ cfu/g anaerobic and aerobic bacteria;
   c) supersaturating said degradation zone with water;
   d) rendering said degradation zone anaerobic;
   e) maintaining said degradation zone supersaturated with water and at a redox potential level below about negative 200 mV until a significant amount of DDT type contaminants is degraded;
   f) thereafter oxygenating said degradation zone to render it aerobic;
   g) maintaining said degradation zone at a redox potential level above about positive 100 mV until a significant amount of DDT type contaminants is degraded; and
   h) repeating steps c) through g).

2. The process of claim 1 wherein nutrient material is added to the degradation zone in an amount in the range of 0% to 5% by weight of the soil.

3. The process of claim 1 wherein said microbes contained in said soil to be decontaminated comprise both indigenous anaerobic and aerobic bacteria.

4. The process of claim 1 wherein surfactant is added to said degradation zone.

5. The process of claim 1 wherein the water content of the degradation zone while it is aerobic is maintained at greater than 50% WHC.

6. The process of claim 1 wherein said degradation zone is maintained supersaturated with water while it is aerobic.

7. The process of claim 1 wherein the water content of the degradation zone while it is aerobic is maintained less than 100% WHC.

8. The process of claim 1 wherein said steps c) to g) are repeated a sufficient number of times to achieve remediation.

9. The process of claim 1 wherein said steps c) through g) are repeated one time.

10. The process of claim 1 wherein said steps c) through g) are repeated more than one time.

11. The process of claim 1 wherein said degradation zone is immersed in water to render said degradation zone anaerobic and maintained immersed in water while anaerobic; and is maintained at a water content of less than 100% WHC while aerobic.

12. The process of decontaminating soil containing DDT-type contaminants which soil contains a population of viable anaerobic and aerobic microbes capable of transforming DDT-type contaminants into harmless materials and being viable under both anaerobic and aerobic conditions comprising:

a) forming a degradation zone comprising said soil;

b) maintaining said degradation zone at a temperature in the range of about 15° C. to 37° C., and maintaining in said degradation zone microbial population counts of at least $10^5$ cfu/g anaerobic and aerobic bacteria;

c) supersaturating said degradation zone with water;

d) rendering said degradation zone anaerobic;

e) maintaining said degradation zone supersaturated with water and at a redox potential level below about negative 200 mV until a significant amount of DDT type contaminants is degraded;

f) thereafter oxygenating said degradation zone to render it aerobic;

g) maintaining said degradation zone at a redox potential level above about positive 100 mV until a significant amount of DDT type contaminants is degraded;

h) continually feeding water onto the top of said degradation zone and removing leachate from below said degradation zone while said degradation is anaerobic and aerobic; and i) repeating steps c) through g).

* * * * *